June 4, 1957     M. J. LA MONTAGNE     2,794,645

PUZZLE

Filed Aug. 7, 1956     2 Sheets-Sheet 1

Inventor
Marshall J. La Montagne
by Roberts, Cushman & Grover
Attys

June 4, 1957 M. J. LA MONTAGNE 2,794,645
PUZZLE
Filed Aug. 7, 1956 2 Sheets-Sheet 2
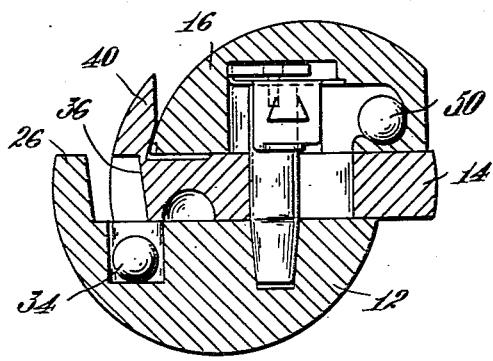
Fig. 10
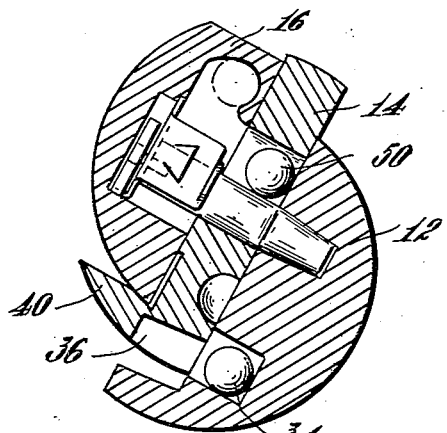
Fig. 11
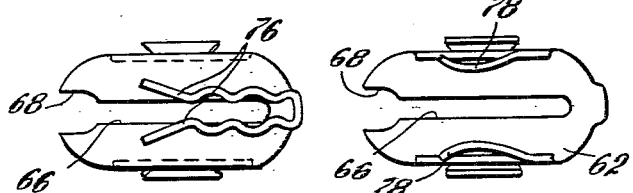
Fig. 17 Fig. 18
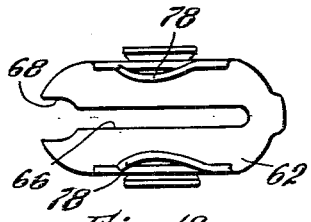
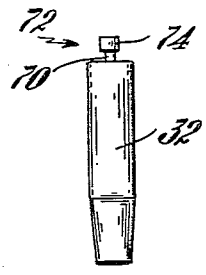
Fig. 14
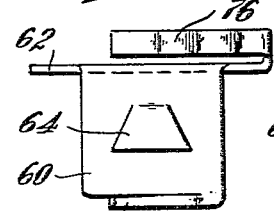
Fig. 15
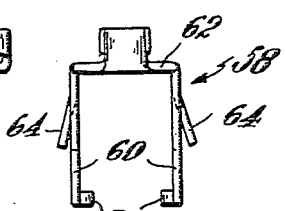
Fig. 16
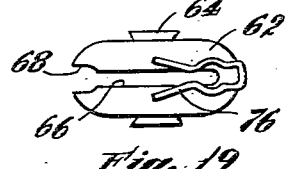
Fig. 19
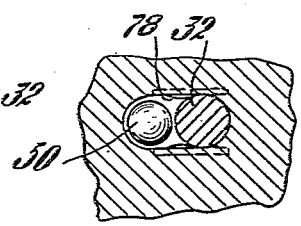
Fig. 12 Fig. 13
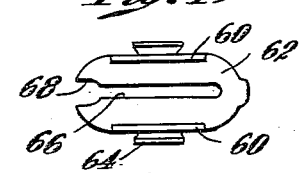
Fig. 20
Inventor
Marshall J. La Montagne
by Roberts, Cushman & Grover
Attys United States Patent Office 2,794,645
Patented June 4, 1957

2,794,645

PUZZLE

Marshall J. La Montagne, Dorchester, Mass.

Application August 7, 1956, Serial No. 602,661

11 Claims. (Cl. 273—156)

This invention relates to puzzles and has for its principal objects to provide a puzzle of several interlocking pieces which requires a considerable amount of ingenuity to unlock and when once unlocked to restore them to their original positions; to provide a puzzle which requires sufficient skill for its solution, to excite one's curiosity and hence to encourage circulation thereof; to provide a puzzle comprised of several pieces which in their normal position simulate some familiar object and hence adapts it to use for commemoration of events, places or persons; and which is adapted when partially or fully disassembled to expose advertising media. Further objects are to provide a device which may be made of comparatively few parts, assembled easily and quickly and will be inexpensive to manufacture.

As herein illustrated the puzzle comprises an assembly of first, second and third pieces, the second piece having spaced parallel, flat surfaces and the first and third pieces having flat surfaces engaged respectively with the surfaces of the second piece. Posts are fixed to the first and second pieces which interengage parts of the second and third pieces respectively, and prevent relative twisting of the pieces about axes perpendicular to their surfaces. A peg is fixed to the first piece perpendicular to its surface and extends through elongate holes in the second and third pieces, the hole in the third piece being longer than that in the second piece and having at the end adjacent the post on the second piece a ball pocket. There is means in the third piece locking the third piece to the end of the peg so as to prevent separation of the pieces without inhibiting relative movement of the peg along the hole or rotation of the third piece about the peg. A ball situated in the hole in the second piece next to the peg, together with the peg fills the hole. A gate is situated in the hole in the third piece midway between its ends, and partially overlaps the hole in the second piece occupied by the ball, thereby preventing the ball from being transferred from the second piece to the third piece. The third piece is shiftable, however, with respect to the peg to open the gate and is swingable about the peg to bring the cleared opening into registration with the other end of the hole in the second piece. The second piece is also shiftable relative to the peg in the one piece to bring either end into engagement with the peg in the absence of the ball therein. The first and second pieces have in their engaged surfaces holes, one of which contains a ball and is deep enough so that the ball located therein, is contained entirely within that piece and the other of which is shallower than the ball so that when the ball is located therein a portion of it projects into the one hole and prevents shifting of the first and second pieces relative to each other.

As herein illustrated the pieces 1, 2 and 3 are sections of a sphere and as such are assembled and exteriorly decorated to simulate a baseball.

The invention will now be described in greater detail with reference to the accompanying drawings wherein:

Fig. 10 is a diametrical section showing the third piece swung around to a diametrically opposite position and shifted from right to left as the fifth step in the separation of the parts;

Fig. 11 is a diametrical section showing the device partially tilted to transfer the ball from the third part to the second part to complete separation and to lock the parts in their disassembled position;

Fig. 12 is a fragmentary section taken on the line 12—12 of Fig. 4;

Fig. 13 is a fragmentary section taken on the line 13—13 of Fig. 5;

Fig. 14 is an elevation of the peg which joins the parts;

Fig. 15 is a side elevation of the latch and ball gate;

Fig. 16 is an end elevation of the latch and ball gate;

Fig. 17 is a top view of Fig. 15;

Fig. 18 is a bottom view of Fig. 15;

Fig. 19 is a top elevation of a modified form of latch with the ball gate omitted; and Fig. 20 is a bottom view of Fig. 19.

Figure 1:
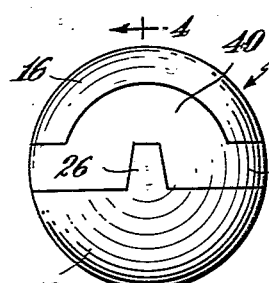
Fig. 1 is an elevation of the puzzle as seen from one side.
Figure 2:
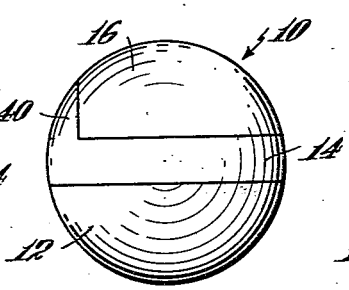
Fig. 2 is an elevation as seen from either the left-hand or right-hand side of Fig. 1.
Figure 3:
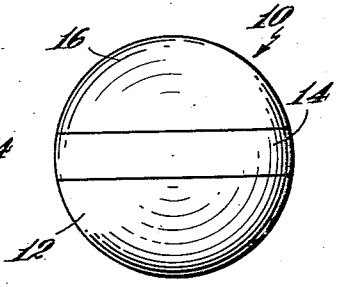
Fig. 3 is an elevation as seen from the back side of Fig. 1.

Referring to the figures, the puzzle is shown in the form of a sphere 10 consisting of three pieces, namely a first piece 12, a second piece 14 and a third piece 16. The second or intermediate piece 14 has spaced flat, parallel surfaces 18 and 20 with which are engaged flat surfaces 22 and 24 of the first and third pieces 12 and 16. The first piece 12, as shown in Figs. 4 to 11, has rising perpendicularly from one end of its flat surface 22 a post 26, the outer surface of which forms a part of the spherical surface of the puzzle. In the top surface 22 diametrically thereof there are two openings 28 and 30, the former providing a seat or socket for receiving one end of a peg 32 (Fig. 14) and the latter a pocket for receiving a ball 34.

Figure 4:
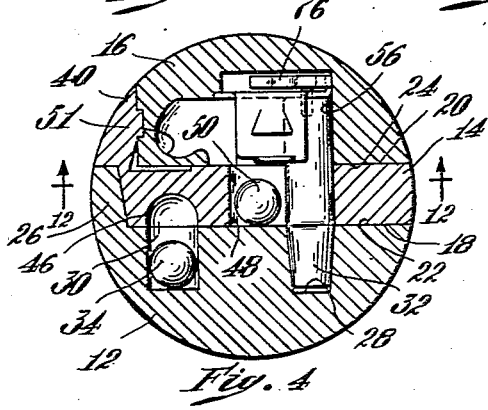
Fig. 4 is a vertical diametrical section of Fig. 1, taken on the line 4—4 with the parts in their normal locked position.
Figure 5:
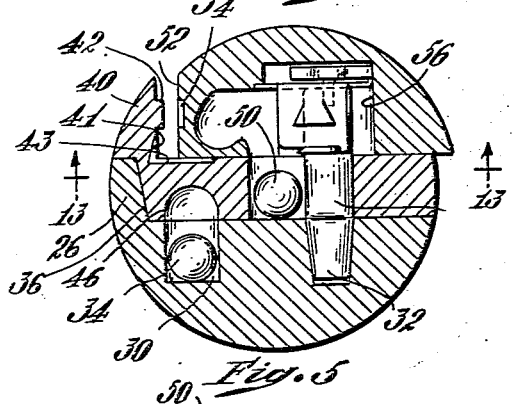
Fig. 5 is a diametrical section showing the third piece shifted to the right as the first step in unlocking the parts.
Figure 6:
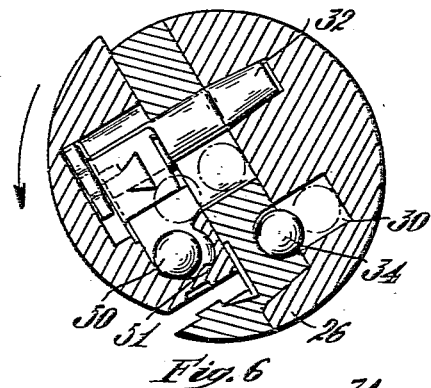
Fig. 6 is a diametrical section like Fig. 5, partially inverted showing the transfer of the ball from the second piece to the third piece as the second step in disengaging the parts.

The intermediate or second piece 14, as shown in Figs. 4 to 11, has at its left-hand end a vertically disposed recess 36 which is the converse of the inner side of the post 26 which projects upwardly from the bottom piece into which the post fits, as shown in Fig. 4, and by interengagement therewith prevents relative twisting of the pieces 12 and 14 about an axis perpendicular to their contacting surfaces until they are shifted relative to each other as will appear hereinafter. Also at the left-hand end of the piece 14 there is a vertically rising post 40 which in horizontal section is segmental, having an outer curved surface corresponding in curvature to the sphere and an inner flat vertical surface perpendicular to the surface 20. The inner surface may be perfectly smooth or optionally may have a positioning boss 42 extending from it. At the base of the post there is a concave recess 41 of spherical contour corresponding in curvature to the exterior surface of the puzzle and in the surface 20 adjacent thereto is a shallow recess 43. In the bottom surface 18 there is a recess 46 which registers with the pocket 30 in the bottom piece 12 but which is not deep enough to receive the entire ball so that when the ball 34 is seated in this recess, as for example when the puzzle is inverted or partially inverted, part of the ball will be in the recess and a part in the pocket and thus prevent relative movement between the first and second pieces (Fig. 6). There is also in the piece 14 an elongate hole 48 which extends through from the surface 18 to the surface 20 and which is wide enough to receive the peg 32 which extends completely through it, as shown in Figs. 4 to 11 inclusive, and a ball 50 located therein beside the peg.

The third piece 16, as shown in Figs. 4 to 11, is cut off at its left end to accommodate the post 40 and has a flat vertical surface 52 for contact with the inner side of the post 40. The surface 52 has in it a shallow recess 54 for reception of the locating boss 42. The bottom surface 24 of the piece 16 has in it an elongate hole 56 which is longer than the hole 48 in the piece 14, although it corresponds in width thereto so as to receive the upper end of the post 32 which projects thereinto, as shown in Figs. 4 to 11 inclusive. At the left end of the hole 56 there is a ball pocket 51. A combination latch and gate member 58 (Figs. 15 to 18 inclusive) is seated in the hole. This member 58 has spaced parallel legs 60 and a bridge plate 62 joining them. The bridge plate 62 corresponds in shape to the cross-section of the hole so that the member fits into the hole when its legs engage with the sides thereof, and is held therein by tangs 64 struck out from the legs which are adopted to be embedded in the walls. The bridge plate 62 has a slot 66 extending longitudinally thereof from one end nearly to the opposite end and the entrance to the slot is widened to provide a mouth 68. The slot 66 is wide enough to receive the neck 70 of a pin 72 projecting from the upper end of the peg 32 and the mouth 68 is wide enough to permit the head 72 of the pin to be thrust through it so as to be engaged with the upper side of the plate, the latter being spaced from the top of the hole sufficiently to permit the head to slide along the slot above the plate. The top side of the plate 62 has on it a pair of spaced spring members 76 located parallel to and at opposite sides of the slot 66. These spring members in conjunction provide a spring clip between which the head 74 may be moved or held in any one of several positions. Engagement of the head 74 of the peg 32 with the slot 66 latches the upper piece 16 to the lower piece 12 and hence serves to hold the pieces assembled so that there is no danger of their becoming accidentally disconnected during manipulation. Near the lower end of each leg 60 there is a flat inwardly bowed spring 78, which springs are located midway between the ends of the hole and normally overlap and constrict the width of the hole (Fig. 12). The springs will however yield to permit the peg 32 to pass from one end of the hole to the other, as will subsequently appear.

Figure 7:
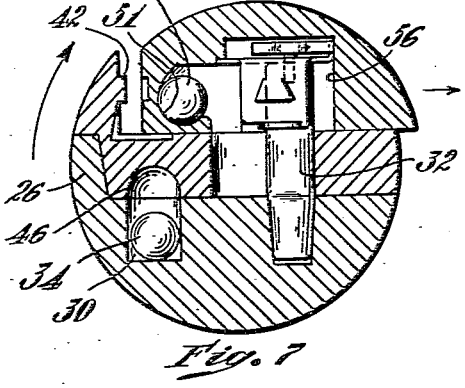
Fig. 7 is a diametrical section showing the device restored to its initial upright position with the ball pocketed in the third piece as the third step in the separation of the parts.
Figure 8:
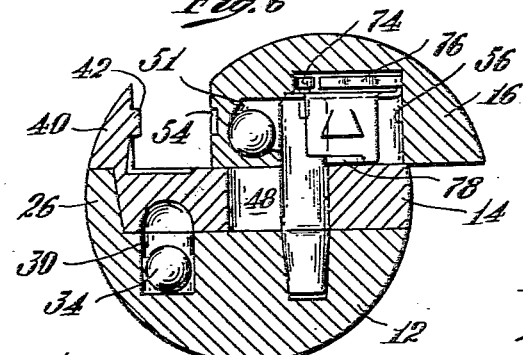
Fig. 8 is a diametrical section showing the third piece shifted further to right as the fourth step in the separation of the parts.
Figure 9:
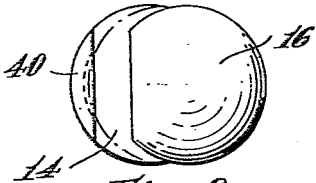
Fig. 9 is a plan view of Fig. 8 to smaller scale.

As thus constructed solution of the puzzle which involves disassembling the pieces and reassembling them is accomplished by way of example as follows: Referring to Fig. 4 which is a vertical section of the puzzle prior to disassembly, that is, when the pieces are in their normal locked position it will be seen that the ball 50 is located in the hole 48 beside the peg 32 (left side) hence preventing shifting of pieces 12 and 14 relative to each other. Piece 16 however is not constrained and may be shifted toward the right away from the post 40 by sliding its surface 24 along the surface 20 of the second piece 14. As the piece 16 is slid toward the right it is, of course, retained in sliding contact with the piece 14 by engagement of the head 74 of the peg 32 with the slotted plate 62. Sliding the piece to the right disengages the head 74 from the first lobe of the springs 76 and as it enters the second lobe it snaps into place with an audible click at which position, as shown in Fig. 5, the left-hand end of the hole 56 coincides with the left-hand end of the hole 48. At this position the springs 78 have been displaced laterally by the peg 32 (Fig. 13) so that they no longer constrict the width of the hole 56 thus providing a clear passage which will permit the ball 50 to be transferred from the hole 48 to the hole 56. As previously described, at the left end of the hole 56 there is a ball pocket 51 and by tipping or partially inverting the puzzle after the part 16 has been drawn to the right, as shown in Fig. 6, the ball 50 can be rolled or dropped through into the hole 56 and from thence into the pocket 51. By carefully restoring the puzzle to its original upright position while tipped forwardly the ball may be held in the pocket, as shown in Fig. 7. The part 16 may now be moved further to the right so as to disengage the head 74 from the second lobe of the springs 76 and thus completely to clear the flat end 52 of the piece 16 from the post 40 so that the piece 16 may be swung about the peg as a center to a diametrically opposite position, as shown in Fig. 10. When swung around the springs 78 overlap the hole 48 so that the ball 50 cannot be transferred to the hole 48 at the right-hand side of the peg. If, however, the piece 16 is now moved to the left, as seen in Fig. 10, by engagement of the spherical end with the recess 41 to cause the peg 32 to spread the springs 78 and hence clear a passage from the hole 56 in to hole 48 the ball 50 may be transferred from its pocket 51 into the hole 48 at the right-hand side of the peg 32 by tipping the device, as shown in Fig. 11. When this is accomplished the puzzle is completely disassembled insofar as is intended. Restoration of the pieces to their original positions is accomplished by following the reverse procedure.

It is, of course, not essential to start with the puzzle in the upright position shown in Fig. 1, however, it is essential during the course of the solution to reverse the position of the puzzle so as to transfer the locking balls 36 and 50 into proper position to release the parts.

The puzzle may be made somewhat simpler by omitting the gate springs 78 from the member 58, as shown in Figs. 19 and 20, and providing single lobe springs 76 at the upper side of the bridge plate 62. As thus constructed the ball 50 is free to fall into the hole 56 anytime the puzzle is inverted, that is, without having first to shift the piece 16 to the right away from the post 40. In this modified form the hole 56 may therefore be made of the same length as the hole 48. In other respects the puzzle is identical with that described above. Still another variation may be made omitting the locking ball 34 and its pocket 30 and recess 46 in which case the piece 12 is freed for shifting as soon as the ball 50 is transferred to the pocket 51.

As illustrated in the drawings the puzzle is in the form of a sphere and hence is especially adapted to simulate a ball, for example, a baseball and its surface may be treated by painting and relief to have the appearance of an official league baseball with raised stitching on its surface. Thus the ball might be sold as a souvenir at baseball parks to represent a particular ball club. The inner surface of the pieces when disassembled, for example, the inner surface of the post 26 or of the post 40 provides a suitable area on which to place advertising media hence the puzzle may be not only used for souvenir purposes but also for advertising purposes.

The puzzle in its spherical shape may represent any kind of ball used in sports and by variation in shape a football, a bowling pin or the like. Any exterior shape that is suitable for the purposes desired may without departing from the spirit of the invention be divided up into pieces associated in the manner herein illustrated and it is intended that the invention shall cover any puzzle regardless of its exterior shape which embodies the internal structural features illustrated herein.

It should be understood that the present disclosure is

I claim:

1. A puzzle comprising an assembly of first, second and third pieces, said second piece having parallel flat surfaces and said first and third pieces having flat surfaces engaged respectively with the surfaces of the second piece, posts fixed to the first and second pieces which interengage parts of the second and third pieces respectively, and which prevent relative twisting of the pieces about axes perpendicular to their surfaces, a peg fixed to the first piece perpendicular to its surface, elongate holes in the second and third pieces into which the peg extends, the hole in the third piece being longer than that in the second piece and having at the end adjacent the post on the second piece a ball pocket, means in the third piece locking the third piece to the end of the peg so as to prevent separation of the pieces without inhibiting relative movement of the peg along the hole or rotation of the third piece about the peg, a ball situated in the hole in the second piece next to the peg and together with the peg filling the hole, said third piece being swingable about the peg to position the ball pocket at either end of the hole in the second piece, and a gate situated in the hole in the third piece, said gate constricting the hole in the third piece next to the ball pocket so that the ball is not free to pass from the hole in the second piece to the hole in the third piece or vice versa, said third piece being shiftable relative to the peg to move the gate to a non-constricting position.

2. A puzzle comprising an assembly of first, second and third pieces, said second piece having parallel flat surfaces and said first and third pieces having flat surfaces engaged respectively with the surfaces of the second piece, posts fixed to the first and second pieces which interengage parts of the second and third pieces respectively, and which prevent relative twisting of the pieces about axes perpendicular to their surfaces, a peg fixed to the first piece perpendicular to its surface, elongate holes in the second and third pieces into which the peg extends, the hole in the third piece being longer than that in the second piece and having at the end adjacent the post on the second piece a ball pocket, means in the third piece locking the third piece to the end of the peg so as to prevent separation of the pieces without inhibiting relative movement of the peg along the hole or rotation of the third piece about the peg, a ball situated in the hole in the second piece next to the peg and together with the peg filling the hole, said third piece being swingable about the peg to position the ball pocket at either end of the hole in the second piece and shiftable in either position to bring the end of the hole next to the ball pocket into registration with the end of the hole in the second piece, and a pair of yieldable inwardly bowed springs located in the hole in the third piece, said inwardly bowed springs partially constricting the hole next to the ball pocket when the ends of the holes are not in registration and being held in a non-constricting poistion, when the ends of the holes are in registration, by the peg.

3. A puzzle according to claim 1, wherein that portion of the peg projecting into the hole in the third piece has a neck and head, and the first-named means includes a plate fastened in the hole in the third piece near the bottom thereof, in which there is a longitudinal slot along which the neck is free to slide with a head engaged with the rear side of the plate.

4. A puzzle according to claim 1, wherein that portion of the peg projecting into the hole in the third piece has a neck and head, the first-named includes a plate fastened in the hole in the third piece near the bottom in which there is a longitudinal slot along which the neck is free to slide and which has at one end a mouth through which the head may be inserted to engage the neck with the slot and the head with the rear side of the plate, and a pair of spaced parallel spring members carried by the plate at the rear side yieldably engaging the head, said springs providing lobes longitudinally thereof for positioning the head at one of several distinct places along the hole.

5. A puzzle according to claim 1, wherein the first piece has a ball pocket within which is located a ball and the second piece has a recess of less diameter than the ball which registers with the pocket in the first piece when the first and second pieces are in registration.

6. A puzzle according to claim 1, wherein the post on the first piece engages a recess in the second piece and the external surface of the post forms a continuation of the surfaces of the first and second pieces.

7. A puzzle according to claim 1, wherein the third piece has a segment thereof removed at the end adjacent the ball pocket, and the post on the second piece corresponds to the segment removed from the third piece and has an exterior surface which forms a continuation of the surface of the third piece.

8. A puzzle according to claim 1, wherein the first, second and third pieces when in registration form a sphere.

9. A puzzle according to claim 1, wherein the third piece has a segment removed from the end adjacent the ball pocket providing a flat vertical surface perpendicular to the surface of the second piece and in which there is a shallow recess and the post on the second piece corresponds to the segment removed from the third piece and has a boss on its inner side which engages within the recess in the vertical surface of the third piece when said second and third pieces are in registration.

10. A puzzle according to claim 1, wherein the third piece has a segment removed from that end adjacent the ball pocket providing a flat vertical surface perpendicular to the surface of the second piece at the base of which there is a concave recess adapted to receive enough of the opposite end of the third piece when swung to its diametrically opposite position to allow the end of the hole in the third piece adjacent the ball pocket to be shifted into registration with the end of the hole in the second piece remote from the post.

11. A puzzle comprising an assembly of first, second and third pieces, said second piece having parallel flat surfaces and said first and third pieces having flat surfaces engaged respectively, with the surfaces of the second piece, posts fixed to the first and second pieces which interengage parts of the second and third pieces respectively, and which prevent relative twisting of the pieces about axes perpendicular to their surfaces, a peg fixed to the first piece perpendicular to its surface, elongate holes in the second and third pieces into which the peg extends, the hole in the third piece having a ball pocket at the end adjacent the post on the second piece, means in the third piece locking the third piece to the end of the peg so as to prevent separation of the pieces without inhibiting relative movement of the peg along the hole or rotation of the third piece about the peg, and a ball situated in the hole in the second piece next to the peg and together with the peg filling the hole, said third piece being swingable about the peg to position the ball pocket at either end of the hole in the second piece and shiftable relative to the peg to move an end of the hole into registration with an end of the hole in the second piece.

References Cited in the file of this patent

UNITED STATES PATENTS

| 536,220 | Miller | Mar. 26, 1895 |
| 589,822 | Estell | Sept. 14, 1897 |
| 1,733,772 | Battershell | Oct. 29, 1929 |
| 2,025,399 | Steinhardt | Jan. 13, 1953 |